United States Patent [19]

Kurimoto

[11] Patent Number: 5,004,572

[45] Date of Patent: Apr. 2, 1991

[54] METHOD OF PRODUCING SKIN TUBE FOR ANNULAR FOAM PRODUCT, AND ASSEMBLY OF THE SKIN TUBE AND CORE STRUCTURE

[75] Inventor: Kazunori Kurimoto, Konan, Japan

[73] Assignee: Tokai Chemical Industries, Ltd., Aichi, Japan

[21] Appl. No.: 272,411

[22] Filed: Nov. 17, 1988

[30] Foreign Application Priority Data

Nov. 20, 1987 [JP] Japan .................... 62-294469

[51] Int. Cl.⁵ ............................................. B29C 67/22
[52] U.S. Cl. ................................ 264/46.6; 264/46.7; 264/46.9; 156/304.2
[58] Field of Search ................. 264/46.6, 46.5, 46.7, 264/46.9; 112/63; 156/79, 304.2; 5/471

[56] References Cited

U.S. PATENT DOCUMENTS

| 278,485 | 5/1883 | Arnold | 112/63 |
| 359,563 | 3/1887 | Hall | 112/63 |
| 4,446,181 | 5/1984 | Wood | 156/304.2 |
| 4,645,557 | 2/1987 | Pedersen | 156/304.2 |
| 4,653,169 | 3/1987 | Puszakowski | 156/304.2 |
| 4,752,350 | 6/1988 | Schuster | 156/304.2 |
| 4,770,735 | 9/1988 | Shaposka et al. | 156/304.2 |
| 4,830,793 | 5/1989 | Fermigier et al. | 264/259 |
| 4,908,170 | 3/1990 | Kurimoto | 264/46.7 |

FOREIGN PATENT DOCUMENTS 60-024906 2/1985 Japan .................... 264/46.7

Primary Examiner—Robert A. Dawson
Assistant Examiner—Allan R. Kuhns
Attorney, Agent, or Firm—Oliff & Berridge

[57] ABSTRACT

A method of preparing an annular skin tube for a foam product. Tubular skins are joined together end to end, at opposite ends thereof except at least one set of unjoined ends of at least one selected pair of the adjacent tubular skins, so as to prepare an intermediate skin tube such that a nominal outside of the intermediate skin tube is exposed. An unjoined portion is provided on the outer periphery of the intermediate skin tube, adjacent to the unjoined ends. The unjoined ends are joined, while end portions including the unjoined ends are superposed on each other and are passed through the unjoined portion outwardly of the intermediate skin tube such that one of the end portions is turned inside out. The above-indicated one end portion is turned over to expose its nominal outside. Thus, the intermediate skin tube is formed into the annular skin tube.

16 Claims, 7 Drawing Sheets

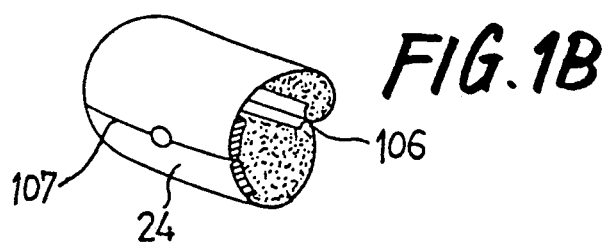
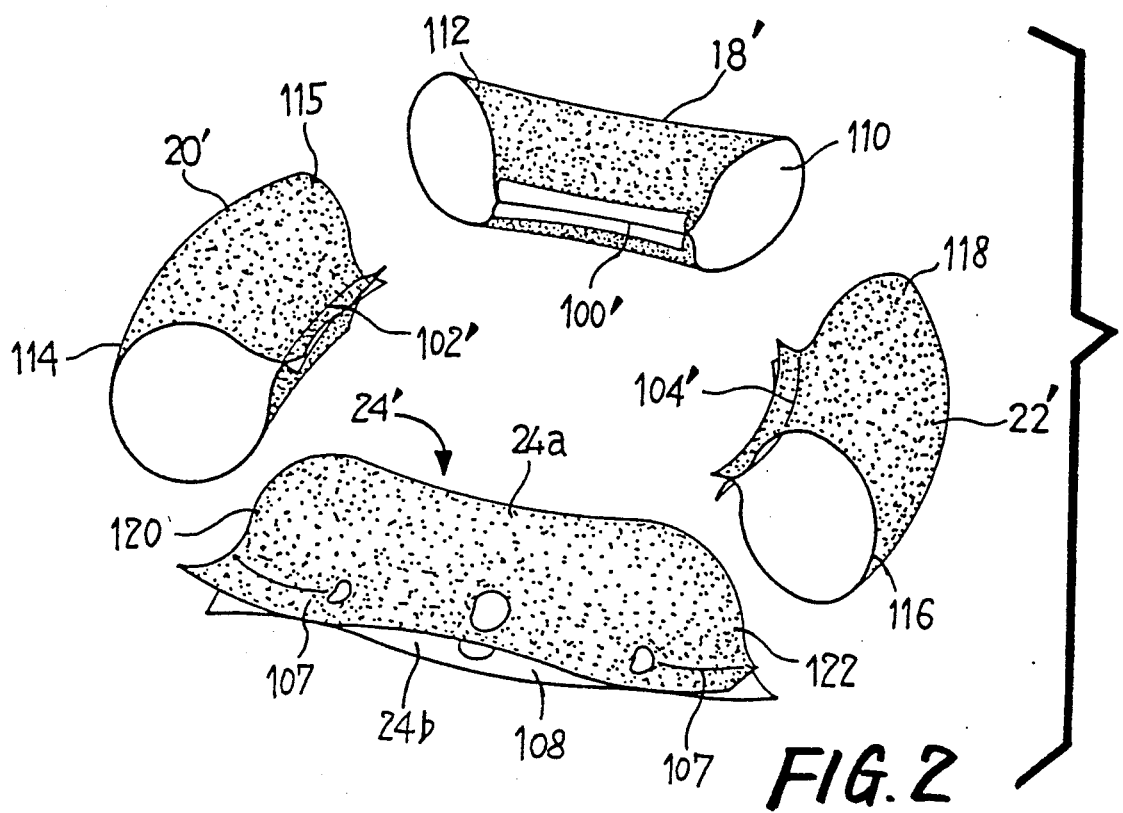
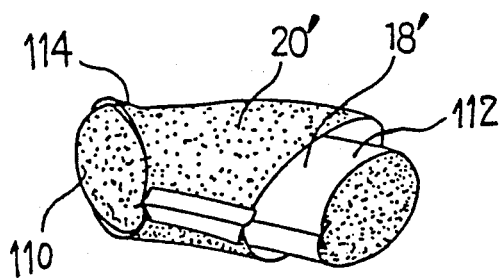
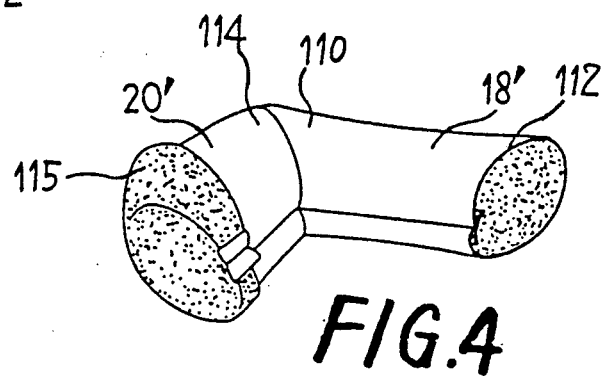

METHOD OF PRODUCING SKIN TUBE FOR ANNULAR FOAM PRODUCT, AND ASSEMBLY OF THE SKIN TUBE AND CORE STRUCTURE

BACKGROUND OF THE INVENTION

1. Field of the Invention

The present invention relates to a method of preparing an annular skin tube which covers an annular foam mass having an opening formed therethrough.

2. Discussion of the Prior Art

A head rest for a seat on a motor vehicle, which has a central opening, is one example of an annular foam product. The head rest is usually produced by injecting a foamable composition into an annular skin tube or cover in which a suitable core structure is set within the skin tube. A foam mass is formed by reaction of the injected foamable composition within the annular skin tube. To produce this type of head rest, the appropriate annular skin tube or cover is prepared, generally by joining a plurality of tubular skins in an end-to-end manner while the tubular skins are turned inside out, i.e., while the nominal inside of each tubular skin is exposed.

To prevent the linearly and circularly joined edges of the skin tube from being exposed or seen on the outer surface of the produced foam product, the tubular skins which have been joined together should be turned over so that the joined edges are located inside of the skin tube. If the tubular skins are completely joined together into an annular shape corresponding to the annular head rest, the obtained annular skin tube with its nominal inside exposed cannot be turned over to expose its nominal outside. To make it possible to turn over the annular skin tube, it has been practiced to provide the skin tube with an unjoined portion left on the inner periphery of the skin tube which defines the central opening. This unjoined portion of the annular skin tube permits the skin tube to be turned over to expose its nominal outside, in order that the linearly and circularly joined edges are located inside of the annular skin tube.

The unjoined portion provided in the annular skin tube is also utilized for positioning the core structure within the annular skin tube.

On the other hand, the unjoined portion left in the prepared annular skin tube should eventually be closed or joined after the skin tube is turned over to expose its nominal outside. Therefore, it is necessary that the unjoined portion be joined such that the joined edges are hidden inside of the skin tube. However, this joining procedure is very difficult and time-consuming.

In the light of the above drawback encountered in the conventional method of preparing an annular skin tube, laid-open Publication No. 62-35811 (published Feb. 16, 1987) of unexamined Japanese Patent Application proposes a technique for closing the unjoined portion left in the annular skin tube, by using gripping plates as indicated at 100, 102 in FIG. 16. Described more specifically, the gripping plates 100, 102 have longitudinally extending recess and projections, respectively. After the annular skin tube 104 with the unjoined portion is turned over to expose its nominal outside, the unjoined edges of the annular skin tube are gripped by and between the gripping plates 100, 102, such that the projection on the gripping plate 102 snaps into the recess in the gripping plate 100.

The use of the gripping plates 100, 102 considerably increases the cost of manufacture of the annular skin tube, and therefore the cost of manufacture of the foam product. Further, the gripping plates are made of a relatively hard material, which deteriorates the cushioning characteristic of the foam product, particularly where the product is a cushioning article such as a head rest for a motor vehicle. Moreover, the gripping plates should have sufficient dimensions, particularly in the direction perpendicular to their length. Consequently, the provision of the gripping plates within the annular skin tube reduces the freedom of design of the foam product.

SUMMARY OF THE INVENTION

It is therefore a first object of the present invention to provide a method suitable for economically preparing an annular skin tube for a foam product, which assures neat appearance of the foam product without requiring such gripping means as conventionally used, and which permits improved characteristics of the foam product and a relatively high degree of design freedom of the foam product.

A second object of the present invention is to provide a method suitable for economically preparing an assembly of an annular skin tube and a core structure for a foam product, which assures neat appearance of the foam product without using the conventionally used gripping means, and which facilitates the positioning of the core structure within the annular skin tube, while permitting improved characteristics of the foam product and a relatively high degree of design freedom of the foam product.

The first object indicated above may be achieved according to the principle of the present invention, which provides a method of preparing an annular skin tube for a foam product, which has an opening defined by an annular inner periphery thereof, comprising the steps of: preparing a plurality of tubular skins each having at least one linearly joined edge portion; joining together the tubular skins in an end-to-end fashion, at opposite ends thereof except at least one set of unjoined ends of at least one selected pair of the adjacent tubular skins, so as to prepare an intermediate skin tube such that a nominal outside of the intermediate skin tube is exposed; providing an unjoined portion on an outer periphery of the intermediate skin tube, adjacent to the above-indicated at least one set of unjoined ends; and joining the adjoining ends of each of the above-indicated at least one selected pair of the adjacent tubular skins of the intermediate skin tube, while end portions including the unjoined ends are superposed on each other and are passed through the unjoined portion outwardly of the intermediate skin tube such that one of the end portions is turned inside out; and turning over the above-indicated one of the end portions to expose a nominal outside thereof, whereby the intermediate skin tube is formed into the annular skin tube.

In the method of the present invention described above, the intended annular skin tube with its nominal outside exposed can be obtained by joining the unjoined ends of the tubular skins of the intermediate skin tube, by utilizing the unjoined portion provided on the outer periphery of the intermediate skin tube. Thus, the instant method permits the preparation of the annular skin tube with substantially all joined edges hidden inside of the tube, without requiring an unjoined portion conventionally provided on the inner periphery of the intermediate skin tube. Consequently, the instant method does not require gripping means as used in the conventional method.

The elimination of the gripping means results in reduced number of process steps to prepare the annular skin tube, and reduced cost of manufacture of the skin tube. Further, the elimination of the gripping means improves the physical characteristics of the foam product, for example, the cushioning characteristics of a head rest for a motor vehicle, and leads to an increased degree of design freedom of the foam product.

For instance, the intermediate skin tube consists of four tubular skins, and one of the four tubular skins is provided with the unjoined portion. This one tubular skin with the unjoined portion is joined to the adjacent tubular skin while the end portion of the adjacent tubular skin which is adjacent to the above-indicated one tubular skin is passed through the unjoined portion.

The second object may be attained according to another aspect of the present invention, which provides an assembly of an annular skin tube and a core structure for a foam product, the annular skin tube having an opening defined by an annular inner periphery thereof, and the core structure being at least partially positioned within the annular skin tube to reinforce the foam product, the method comprising the steps of: preparing a plurality of tubular skins each having at least one linearly joined edge portion; joining together the plurality of tubular skins end to end, at opposite ends thereof except at least one set of unjoined ends of at least one selected pair of the adjacent tubular skins, so as to prepare an intermediate skin tube such that a nominal outside of the intermediate skin tube is exposed; providing an unjoined portion on an outer periphery of the intermediate skin tube, adjacent to the above-indicated at least one set of unjoining ends; and joining the unjoining ends of each of the at least one selected pair of the adjacent tubular skins of the intermediate skin tube, while end portions including the unjoined ends are superposed on each other and are passed through the unjoined portion outwardly of the intermediate skin tube such that one of the end portions is turned inside out; turning over the above-indicated one of the end portions to expose a nominal outside thereof, whereby the intermediate skin tube is formed into the annular skin tube; and positioning at least a portion of the core structure within the annular skin tube, through the unjoined portion provided on the outer periphery of the annular skin tube.

The instant method permits the preparation of the annular skin tube in the same manner as described above, and also permits the core structure to be positioned in the annular skin tube, by utilizing the unjoined portion provided on the annular skin tube.

The core structure may include an attaching portion for attaching the foam product to a desired object. The attaching portion extends from the portion of the core structure positioned within the annular skin tube, outwardly of the annular skin tube, through a segment of the skin tube which corresponds to one of the plurality of tubular skins. The unjoined portion is provided on the above-indicated one tubular skin.

For example, an annular head rest for a seat of an automotive vehicle may be suitably produced by using the assembly prepared by the instant method. In this case, the attaching portion of the core structure is attached to the seat of the vehicle.

According to the invention, there is also provided a method of preparing an annular skin tube for a foam product, which has an opening defined by an annular inner periphery thereof, comprising the steps of: preparing a single tubular skin such that a nominal outside of the tubular skin is exposed; providing an unjoined portion in a part of an outer periphery of the tubular skin, which part is adjacent to one of opposite ends of the tubular skin; and joining the opposite ends of the tubular skin while end portions including the opposite ends are superposed on each other and are passed through the unjoined portion outwardly of the tubular skin such that one of the end portions is turned inside out; and turning over the above-indicated one of the end portions to expose a nominal outside thereof, whereby the single tubular skin is formed into the annular skin tube.

The present method described above also permits the preparation of the annular skin tube such that substantially all joined edges are hidden inside of the tube, without requiring the conventionally used gripping means for closing the unjoined portion provided on the inner periphery of the tube.

BRIEF DESCRIPTION OF THE DRAWINGS

The above and other objects, features and advantages of the present invention will be better understood by reading the following detailed description of presently preferred embodiments of the present invention, when considered in connection with the accompanying drawings, in which:

FIG. 1B is a fragmentary perspective view in cross section of one of the tubular skin members of FIG. 1A taken along line B—B of FIG. 1A;

FIGS. 2 through 11 are perspective views illustrating a procedure for preparing the annular skin tube of the head rest of FIG. 1A;

DETAILED DESCRIPTION OF THE PREFERRED EMBODIMENTS

Figure 1A:
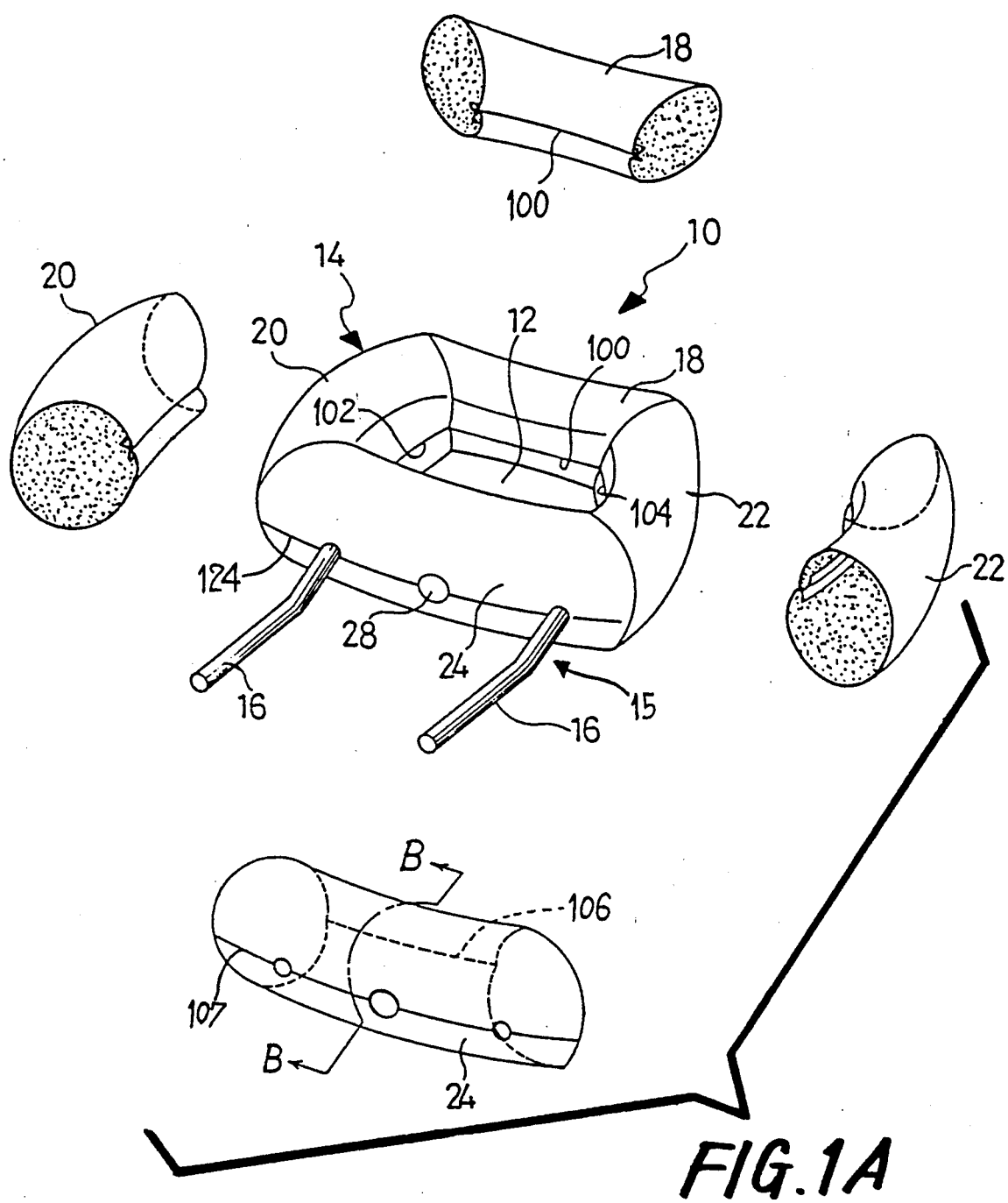
FIG. 1A is a perspective view showing one example of an annular foam product in the form of a head rest for a motor vehicle, prepared according to one embodiment of the present invention, and individual tubular skin members constituting an annular skin tube of the foam product.
Figure 5:
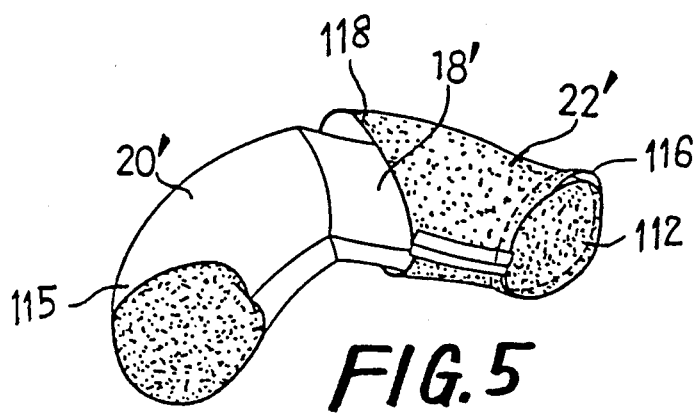

Referring first to FIG. 1, there is shown an annular foam product or article in the form of a head rest 10 manufactured according to one embodiment of the present invention. The head rest 10 consists of an annular foam mass contained in an annular skin tube or cover 14, and a core structure 15 (also shown in FIGS. 12 and 13). As most clearly shown in FIG. 13, the core structure 15 has a generally U-shaped portion 26 embedded in the foam mass to reinforce the foam mass, and two stays 16, 16 which extend from the foam mass for attachment of the head rest to a seat of an automotive vehicle. The inner periphery of the annular skin tube 14 defines a generally rectangular opening 12. That is, the annular skin tube 14 has a generally rectangular shape having four sides which define the opening 12. The skin tube 14 consists of four tube segments 18, 20, 22 and 24 which correspond to the four sides of the rectangle indicated above. The tube segments 18, 20, 22, 24 have respective straight seams 100, 102, 104, 106, which are located on the inner periphery of the annular skin tube 14.

Figure 7:
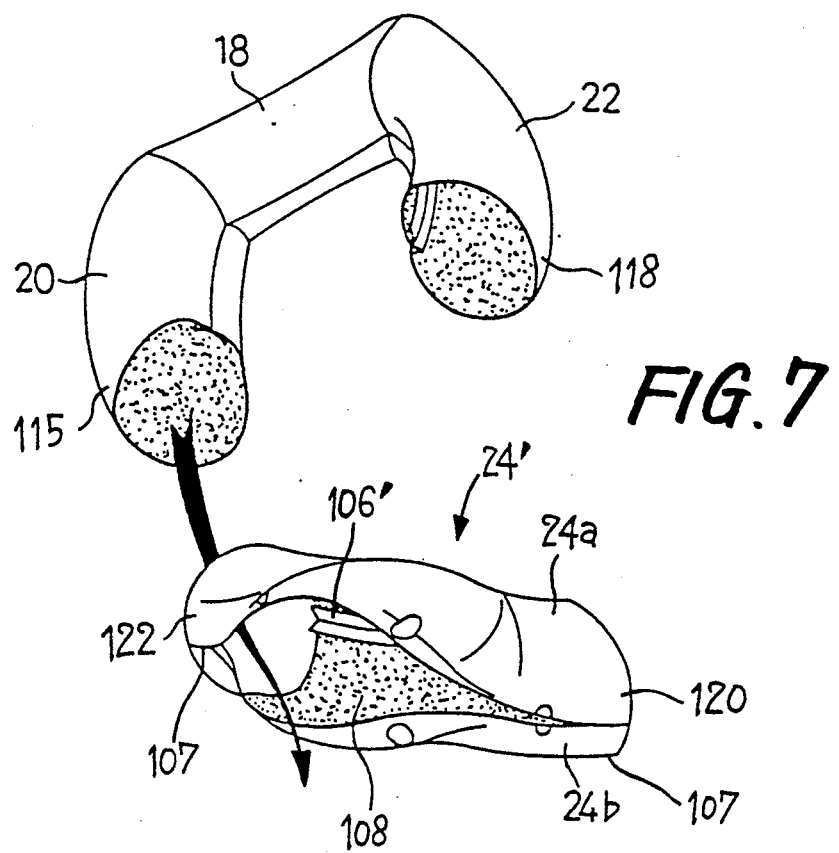

The tube segments 18, 20, 22, 24 are formed from respective skin sheets 18', 20', 22' and 24' as shown in FIG. 2. Described more specifically, each skin sheet 18', 20', 22', 24' is formed into a tubular shape by joining opposite straight edges as indicated at 100', 102', 104', 106' (FIGS. 7-9) such that the nominal inside of the prepared tubular skin 18', 20', 22', 24' is exposed. That is, the linearly joined edges 100', 102', 104', 106' are located outside of the tubular skins 18', 20', 22', 24'. As indicated in FIG. 2, the skin sheet or tubular skin 24' is formed from two skin members which are linearly joined at the corresponding edges as indicated at 106' (FIG. 7). The linearly joined edges 106' define the straight seam 106 of the skin tube 14. The edges of the two skin members 24a, 24b opposite to the linearly joined edges 106' are partially joined at the opposite end portions of the tube 24', as indicated at 107 in FIGS. 2 and 7, but are left unjoined at the intermediate portion of the tube 24', as indicated at 108 in FIGS. 2 and 7.

The skin sheet 24' may be a single skin member whose opposite edges are partially joined as indicated at 107 in FIGS. 2 and 7. In this case, there are no linearly joined edges 106' which define the straight seam 106.

As indicated in FIG. 2, the tubular skin 18' has opposite mitred ends 110, 112, and the tubular skin 20' has opposite mitred ends 114, 115. Similarly, the tubular skin 104' has opposite mitred ends 116, 118, and the tubular skin 24' has opposite mitred ends 120, 122.

There will be described the manner in which the tubular skins 18', 20', 22', 24' are joined together in the end-to-end fashion, to form the annular skin tube 14 which consists of the four tube segments 18, 20, 22, 24.

Figure 6:
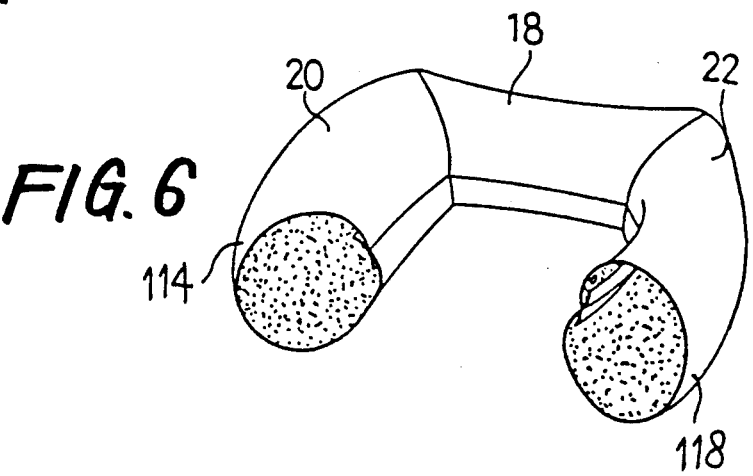

Initially, one of the three tubular skins 18', 20' and 22', for example, the tubular skin 18' is turned over to expose its nominal outside, and is inserted into the tubular skin 20' whose nominal inside is exposed, as indicated in FIG. 3. In this condition, the two tubular skins 18' and 20' are circularly joined together at the corresponding ends 110, 114. Then, the tubular skin 20' is turned over to expose its nominal outside, as shown in FIG. 4. Similarly, the tubular skin 18' is inserted into the tubular skin 22', and the corresponding ends 112, 116 are circularly joined together. The tubular skin 22' is then turned over to expose its nominal outside. Thus, a generally U-shaped skin tube 18, 20, 22 is formed as shown in FIG. 6.

Figure 8:
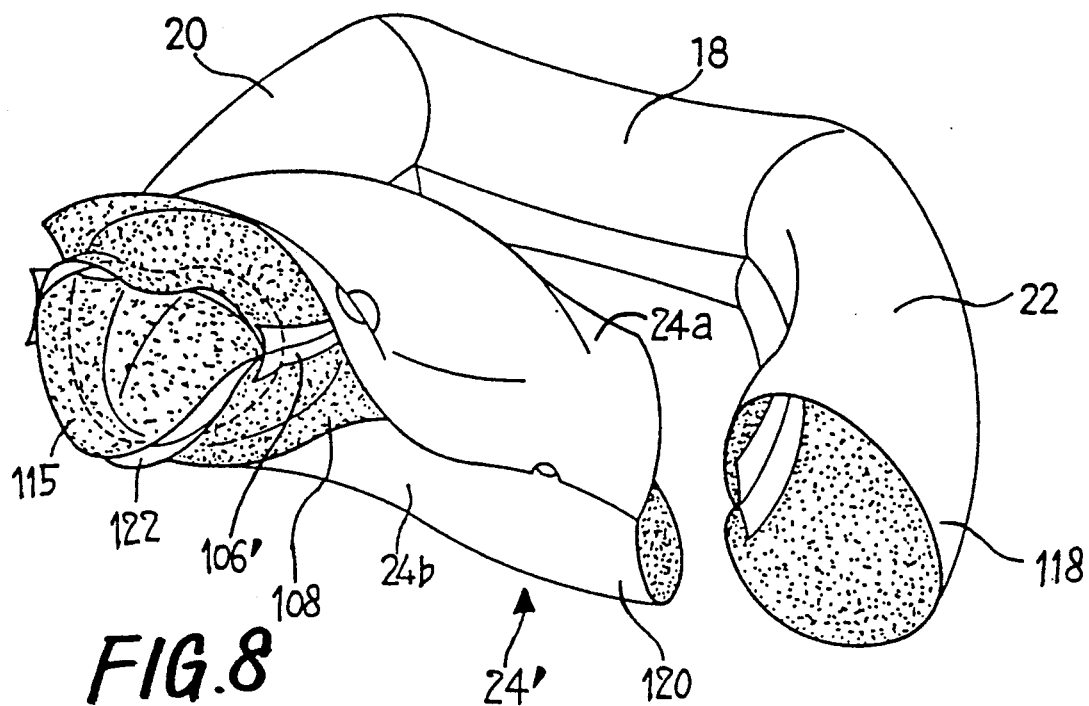
Figure 9:
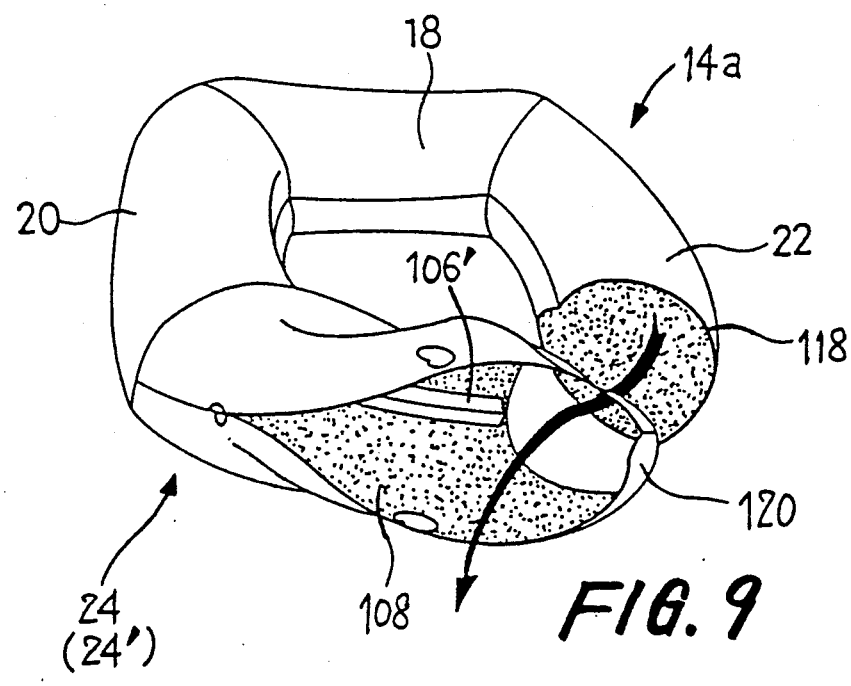

The fourth tubular skin 24' is turned over to expose its nominal outside, as indicated in FIG. 7, and the unjoined end 115 of the tube segment 20 is passed through the open end 122 of the tubular skin 24', as shown in FIG. 8. More particularly, the end portion of the tubular skin 24' which includes the end 122 is turned over to expose its nominal inside as indicated in FIG. 8, before the end 115 of the tube segment 20 is inserted into the end portion of the tubular skin 24'. The superposed end portions 115, 122 are passed through the unjoined in portion 108, such that the superposed end portions 115, 122 are located outside of the tubular skin 24', as indicated in FIG. 8. In this condition, the ends 115, 122 of the tube segment 20 and tubular skin 24' are circularly joined together. Then, the circularly or annularly joined end portions 115, 122 are turned over to expose their nominal outside, as shown in FIG. 9. In this condition, the annular skin tube 14 shown in FIG. 1 is almost prepared, but the ends 118, 120 of the tube segments 22, 24 are left unjoined, and the tube segment 24 (tubular skin 24') still have the unjoined intermediate portion or opening 108, as indicated in FIG. 9. In other words, the tube segments 18, 20, 22, 24 are joined together end to end, except at one of the four corners of the annular skin tube 14. For convenience sake, this state of the skin tube 14 during a process of preparing the tube 14 is referred to as an intermediate skin tube indicated at 14a in FIG. 9. It is noted that the intermediate skin tube 14a has the unjoined intermediate portion 108, which is utilized for joining the ends 115, 122, and the ends 119, 120.

Figure 10:
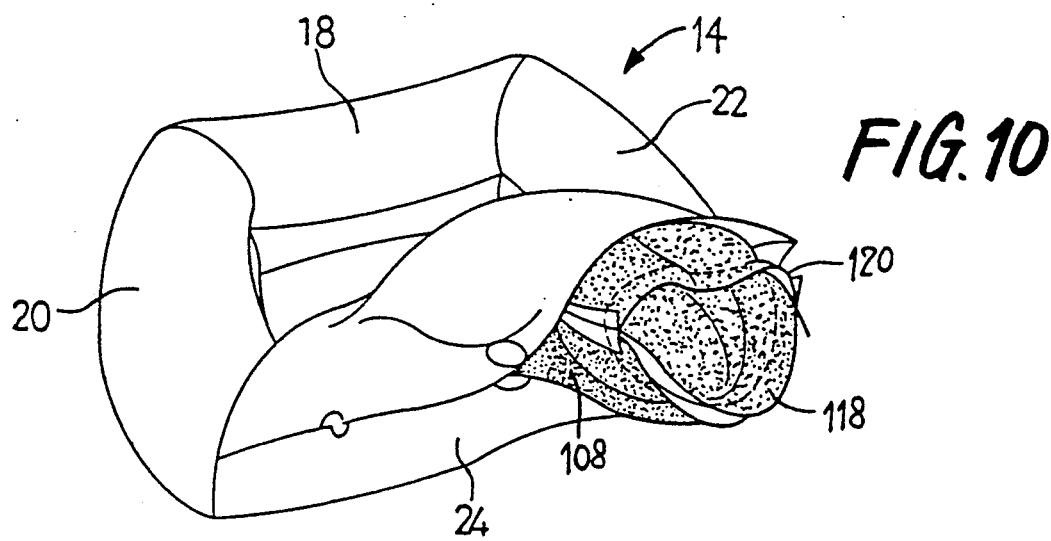

To complete the joining of the four tube segments 18, 20, 22, 24 of the annular skin tube 14, the unjoined end portion 118 of the tube segment 22 is passed through the turned-over end portion 120 of the tube segment 24, as indicated by arrow in FIG. 9, and the superposed end portions 118, 122 are passed through the unjoined intermediate portion 108 of the tube segment 24, as shown in FIG. 10. In this condition, the ends 118, 122 are circularly joined together, and the joined end portions are turned over to expose their nominal outside. Thus, the unjoined intermediate portion 108 functions as an open portion for permitting the end-to-end annular joining of the unjoined end portions 118 and 120 of the tube segments 22, 24.

Figure 11:
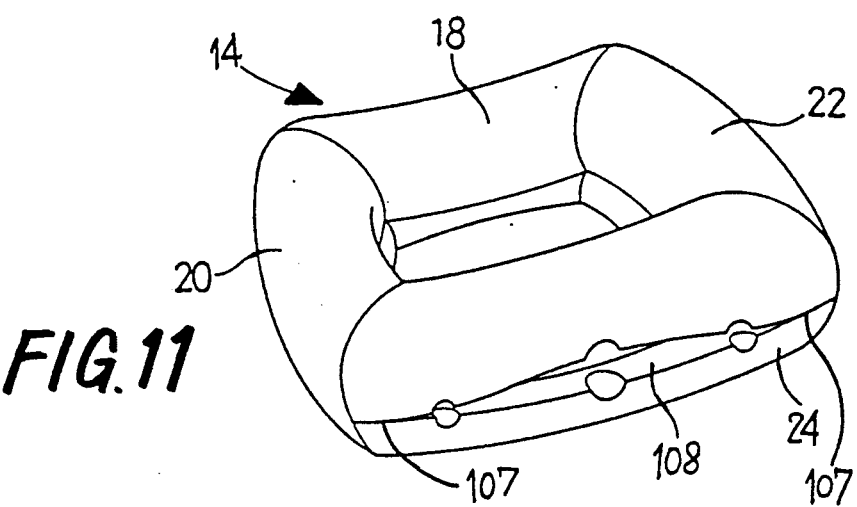

As described above, the annular skin tube 14 is prepared, with the intermediate portion 108 left unjoined or open, as indicated in FIG. 11. It will be understood that both the linearly joined straight edges 100', 102', 104', 106, and the circularly or annularly joined mitred edges 114, 110, 112, 116, 115, 122, and 118, 120 are located inside of the annular skin tube 14, and are not seen from the outside. That is, only the seams 100, 102, 104, 106 are externally seen, as indicated in FIGS. 1A and 1B.

Figure 12:
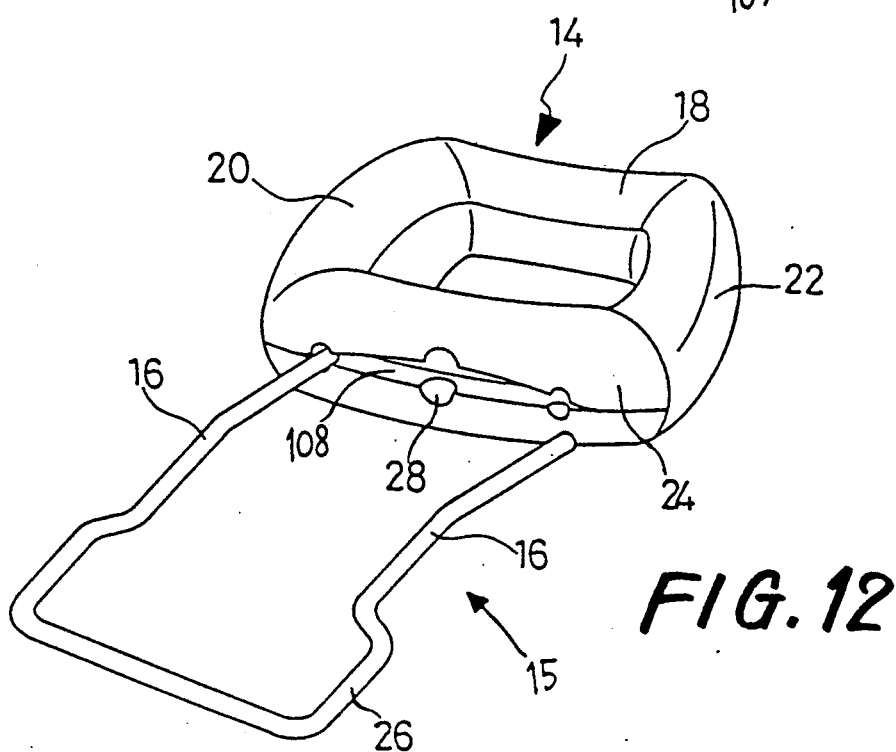
FIGS. 12 and 13 are perspective views showing a manner in which a core structure is inserted into the skin tube.
Figure 13:
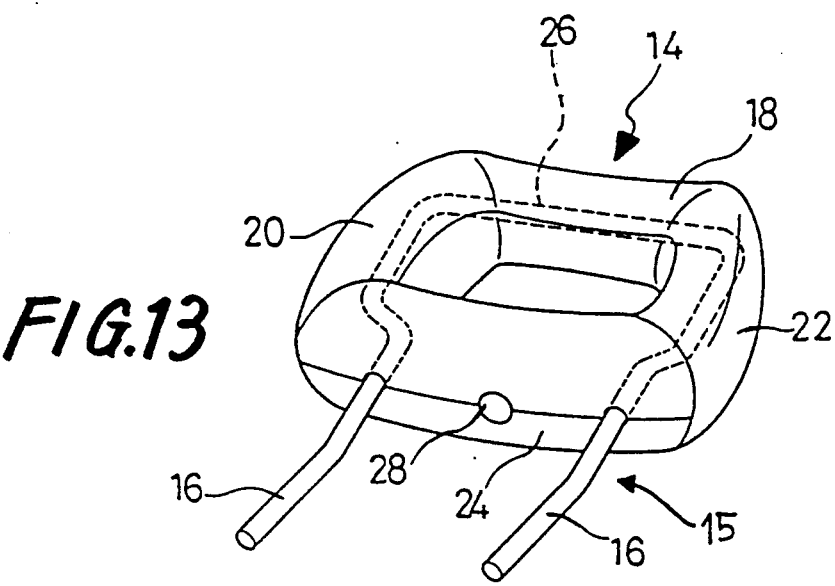

Subsequently, the U-shaped portion 26 of the core structure 15 is positioned within the annular skin tube 14. More specifically, one of the stays 16 is first inserted into the skin tube 14 through the unjoined portion 108 of the tube segment 24, as indicated in FIG. 12. Then, the core structure 15 is turned relative to the skin tube 14, in a plane parallel to the plane of the skin tube 14, so that the three sides of the U-shaped portion 26 of the core structure 15 is positioned in the respective three tube segments 18, 20, 22, as indicated in FIG. 13. In the next step, the unjoined portion or opening 108 is closed, except at its middle part which is used as a nozzle inlet 28 through which a foamable material or composition is injected into the annular skin tube 14, as described below.

The thus prepared assembly of the skin tube 14 and the core structure 15 is set in a suitable foaming mold, and the foamable composition is injected through the nozzle inlet 28, to fill the space formed between the U-shaped portion 26 of the core structure 15 and the inner surface of the skin tube 14. The skin tube 14 is filled with a foam mass by reaction of the injected foamable composition.

Figure 14:
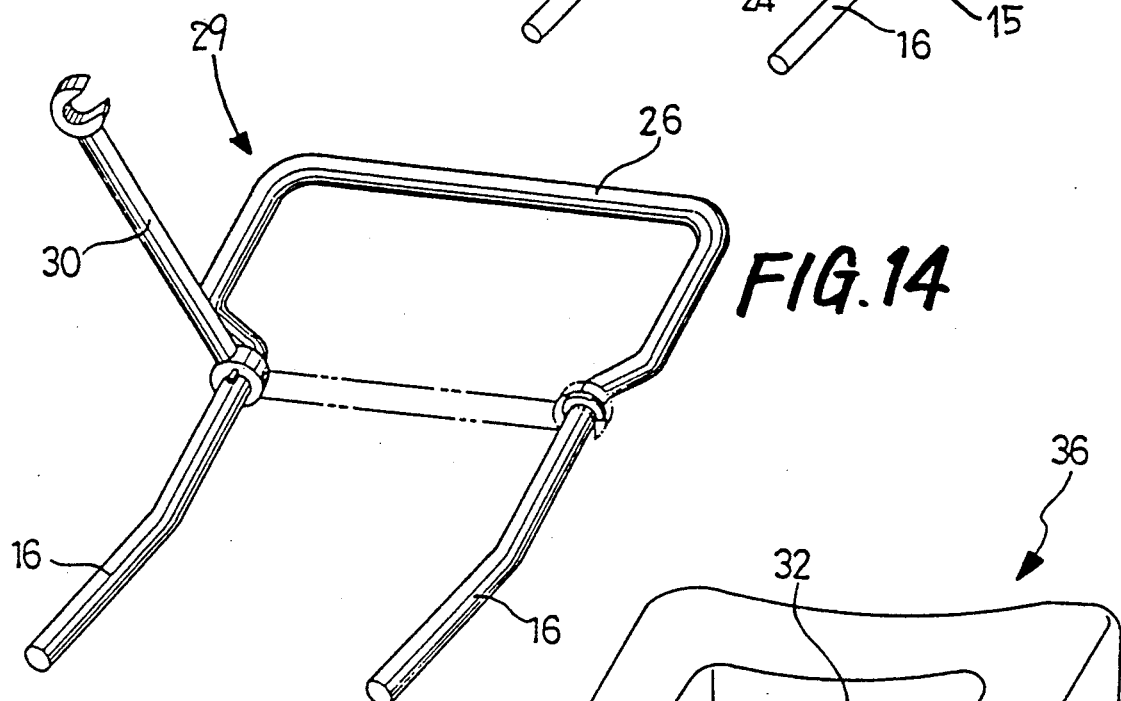
FIG. 14 is a perspective view of a modified form of the core structure of the head rest.

While the core structure 15 does not have a connecting portion which connects the ends of the U-shaped portion 26, it is possible to use a core structure 29 which has a connecting rod 30 as illustrated in FIG. 14. In this instance, the connecting rod 30 is mounted at the ends of the U-shaped portion 26, after the U shaped portion 26 is positioned within the skin tube 14. The connecting rod 30 is slidable at its one end on one of the stays 16, 16 and is pivotable about the stay, so that the other end of the rod 30 is press-fitted on the other stay 16. In the presence of the connecting rod 30, the core structure 29 is given a relatively high degree of strength.

While the present invention has been described in its preferred embodiment, it is to be understood that various changes and modifications may be made in the present invention.

In the illustrated embodiment, the skin sheets 18', 20', 22', 24' are turned over one after another to expose their nominal outside after the skin sheets are longitudinally joined together along the opposite edges 100', 102', 104', 106' (and the edge portions 107 of the skin members 24a, 24b of the skin sheet 24') into tubular forms. However, it is possible that the skin sheets 18', 20', 22', 24' are first joined together end to end, except at the ends 118, 120, and then turned over to expose their nominal outside. Alternatively, the ends 110 and 112 of the skin sheet 18' and the end 115 of the skin sheet 20' are first joined to the ends 114 and 116 of the skin sheets 20', 22' and the end 122 of the skin sheet 24', respectively, while the nominal inside of each skin sheet 18', 20', 22', 24' is exposed. Then, the edges 100', 102', 104', 106', 107 are linearly joined together, and the obtained annular skin tube is turned over to expose its nominal outside. Subsequently, the unjoined ends 118 and 120 of the tube segments 22, 24 are joined together, in the same manner as described above.

Although the illustrated annular skin tube 14 consists of the four tube segments 18, 20, 22, 24, the skin tube of an annular foam article produced according to the present invention may consist of three or two tube segments, provided that the inner peripheries of the tube segments cooperate with each other to define an opening in the central portion of the produced article. Alternatively, a single tubular skin may be formed into an annular skin tube, by joining the opposite ends of the tubular skin such that one end portion of the tubular skin is passed through an opening formed adjacent to the other end portion of the tubular skin. For instance, the tube segments 18, 20, 22, 24 as indicated in FIG. 9 may be a single continuous tubular skin which corresponds to the intermediate skin tube 14a. In this case, one end 118 of the intermediate skin tube 14a is joined to the other end 120 by utilizing the unjoined portion 108 provided on the outer periphery of the tube, adjacent to the end 120. Thus, an annular skin tube 18, 20, 22, 24 may be formed of a single tubular skin.

Figure 15:
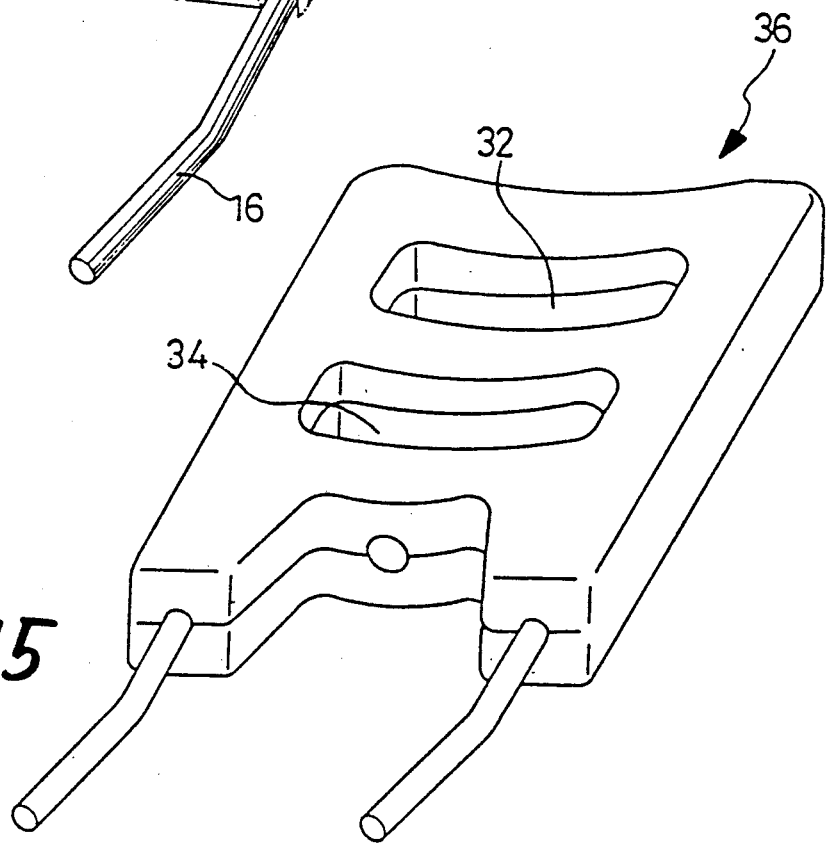
FIG. 15 is a perspective view showing another form of the head rest prepared according to the present invention.
Figure 16:
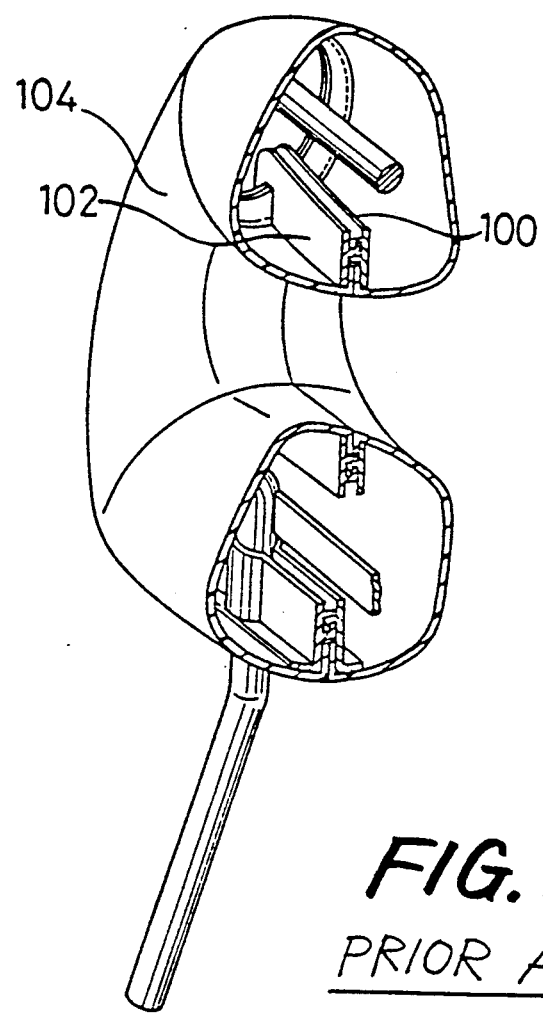
FIG. 16 is a fragmentary partly cut-away perspective view showing a foam product prepared according to a known method.

While the illustrated embodiment is applied to the head rest 10 which has an annular rectangular configuration having the opening 12, the principle of the invention may be practiced to produce a head rest 36 which has two parallel openings 32, 34 which are spaced apart from each other in the direction in which the head rest is mounted on a vehicle seat, as illustrated in FIG. 15. Further, the head rest produced according to the invention may have openings which are spaced apart from each other in the direction perpendicular to the direction in which the head rest is mounted. In these cases, too, the head rests are considered as an annular foam product to which the invention is applicable. Moreover, the present invention is applicable to annular foam products other than the head rest for a motor vehicle.

It will be understood that the invention may be embodied with various other changes, modifications and improvements, which may occur to those skilled in the art, without departing from the spirit and scope of the invention defined in the following claims.

What is claimed is:

1. A method of preparing an annular skin tube for a foam product, which has an opening defined by an annular inner periphery thereof, comprising steps of:
    preparing a plurality of tubular skins each having at least one linearly joined edge portion;
    joining together said plurality of tubular skins end to end, at opposite ends thereof except at least one set of unjoined ends of at least one selected pair of adjacent tubular skins, so as to prepare an intermediate skin tube such that a nominal outside of said intermediate skin tube is exposed;
    providing an unjoined portion in an outer periphery of said intermediate skin tube, adjacent to said at least one set of unjoined ends; and
    joining the unjoined ends of each of said at least one selected pair of the adjacent tubular skins of said intermediate skin tube, while end portions including said unjoined ends are superposed on each other and are passed through said unjoined portion outwardly of said intermediate skin tube such that one of said end portions is turned inside out; and
    passing said one of the end portions back through said unjoined portion inwardly to expose a nominal outside thereof, whereby said intermediate skin tube is formed into said annular skin tube.

2. A method according to claim 1, wherein said plurality of tubular skins consist of four tubular skins, and one of said four tubular skins has said unjoined portion, said one tubular skin is joined to the adjacent tubular skin while the end portion of said adjacent tubular skin which is adjacent to said one tubular skin is passed through said unjoined portion.

3. A method of preparing an assembly of an annular skin tube and a core structure for a foam product, said annular skin tube having an opening defined by an annular inner periphery thereof, and said core structure being at least partially positioned within said annular skin tube to reinforce said foam product, said method comprising the steps of:
    preparing a plurality of tubular skins each having at least one linearly joined edge portion;
    joining together said plurality of tubular skins end to end, at opposite ends thereof except at least one set of unjoined ends of at least one selected pair of adjacent tubular skins, so as to prepare an intermediate skin tube such that a nominal outside of said intermediate skin tube is exposed;
    providing an unjoined portion in an outer periphery of said intermediate skin tube, adjacent to said at least one set of unjoined ends;
    joining the unjoined ends of each of said at least one selected pair of the adjacent tubular skins of said intermediate skin tube, while end portions including said unjoined ends are superposed on each other and are passed through said unjoined portion outwardly of said intermediate skin tube such that one of said end portions is turned inside out;
    passing said one of the end portions back through said unjoined portion inwardly to expose a nominal outside thereof, whereby said intermediate skin tube is formed into said annular skin tube; and
    positioning at least a portion of said core structure within said annular skin tube by passing said core structure through said unjoined portion.

4. A method according to claim 3, wherein said core structure includes an attaching portion for attaching said foam product to a desired object, said attaching portion extending from said portion of the core structure positioned within said annular skin tube, outwardly of said annular skin tube, through a segment of said skin tube which corresponds to one of said plurality of tubular skins, said unjoined portion being formed in said one tubular skin.

5. A method according to claim 4, wherein said foam product is a head rest for an automotive vehicle, and said attaching portion of said core structure is attached to a seat of said vehicle.

6. A method of preparing an annular skin tube for a foam product, which has an opening defined by an annular inner periphery thereof, comprising the steps of:
preparing a single tubular skin such that a nominal outside of said tubular skin is exposed;
providing an unjoined portion in a part of an outer periphery of said tubular skin, which part is adjacent to one of opposite ends of said single tubular skin;
joining said opposite ends of said tubular skin such that end portions of said opposite ends are superposed on each other and are passed through said unjoined portion outwardly of said tubular skin such that one of said end portions is turned inside out; and
passing said one of the end portions back through said unjoined portion inwardly to expose a nominal outside thereof, whereby said single tubular skin is formed into said annular skin tube.

7. A method according to claim 1, wherein each of said opposite ends of said plurality of tubular skins consists of an annular mitred end.

8. A method according to claim 3, wherein each of said opposite ends of said plurality of tubular skins consists of an annular mitred end.

9. A method of producing an annular foam product having a skin tube which has an opening defined by an annular inner periphery thereof, comprising the steps of:
preparing a plurality of tubular skins having at least one linearly joined edge portion;
joining together said plurality of tubular skins end to end, at opposite ends thereof except at least one set of unjoined ends of at least one selected pair of adjacent tubular skins, so as to prepare an intermediate skin tube such that a nominal outside of said intermediate skin tube is exposed;
providing an unjoined portion in an outer periphery of said intermediate skin tube, adjacent to said at least one set of unjoined ends;
joining the unjoined ends of each of said at least one selected pair of the adjacent tubular skins of said intermediate skin tube, while end portions including said unjoined ends are superposed on each other and are passed through said unjoined portion outwardly of said intermediate skin tube such that one of said end portions is turned inside out;
passing said one of the end portions back through said unjoined portion inwardly to expose a nominal outside thereof, whereby said intermediate skin tube is formed into said annular skin tube; and
injecting a foamable material into said annular skin tube, and filling said annular skin tube with a foam filler formed by the injected foamable material.

10. A method according to claim 9, wherein said plurality of tubular skins consists of four tubular skins, and one of said four tubular skins has said unjoined portions, said one tubular skin is joined to the adjacent tubular skin while the end portion of said adjacent tubular skin which is adjacent to said one tubular skin is passed through said unjoined portion.

11. A method of producing an annular foam product having a core structure and an annular skin tube, said annular skin tube having an opening defined by an annular inner periphery thereof, and said core structure being at least partially positioned within said annular skin tube to reinforce said foam product, said method comprising the steps of:
preparing a plurality of tubular skins each having at least one linearly joined edge portion;
joining together said plurality of tubular skins end to end, at opposite ends thereof except at least one set of unjoined ends of at least one selected pair of adjacent tubular skins, so as to prepare an intermediate skin tube such that a nominal outside of said intermediate skin tube is exposed;
providing an unjoined portion in an outer periphery of said intermediate skin tube, adjacent to said at least one set of unjoined ends;
joining the unjoined ends of each of said at least one pair of the adjacent tubular skins of said intermediate skin tube, while end portions including said unjoined ends are superposed on each other and are passed through said unjoined portion outwardly of said intermediate skin tube such that one of said end portions is turned inside out;
passing said one of the end portions back through said unjoined portion inwardly to expose a nominal outside thereof, whereby said intermediate skin tube is formed into said annular skin tube;
positioning at least a portion of said core structure within said annular skin tube by passing said core structure through said unjoined portions; and
injecting a foamable material into a cavity formed between said tubular skin and said core structure, and filling said cavity with a foam filler formed by the injected foamable material.

12. A method according to claim 11, wherein said core structure further includes an attaching portion for attaching said foam product to a desired object, said attaching portion extending from said portion of the core structure positioned within said annular skin tube, outwardly of said annular skin tube, through a segment of said skin tube which corresponds to one of said plurality of tubular skins, said unjoined portion being formed in said one tubular skin.

13. A method according to claim 12, wherein said foam product is a head rest for an automotive vehicle, and said attaching portion of said core structure is attached to a seat of said vehicle.

14. A method of producing an annular foam product having an annular skin tube, which has an opening defined by an annular inner periphery thereof, comprising the steps of:
preparing a single tubular skin such that a nominal outside of said tubular skin is exposed;
providing an unjoined portion in a part of an outer periphery of said tubular skin, which part is adjacent to one of opposite ends of said singular tubular skin;
joining said opposite ends of said tubular skin such that end portions of said opposite ends are superposed on each other and are passed through said unjoined portion outwardly of said tubular skin such that one of said end portions is turned inside out;

passing said one of the end portions back through said unjoined portion inwardly to expose a nominal outside thereof, whereby a single tubular skin is formed into said annular skin tube; and injecting a foamable material into said tubular skin tube, and filling said tubular skin tube with a foam filler formed by the injected foamable material.

15. A method according to claim 9, wherein each of said opposite ends of said plurality of tubular skins consists of an annular mitred end.

16. A method according to claim 11, wherein each of said opposite ends of said plurality of tubular skins consists of an annular mitred end.

* * * * *